United States Patent
Waterman

[11] Patent Number: 5,653,477
[45] Date of Patent: Aug. 5, 1997

[54] HIGH PRESSURE ACCESS FITTING AND METHOD

[75] Inventor: David K. Waterman, Santa Fe Springs, Calif.

[73] Assignee: Rohrback Cosasco Systems, Inc., Santa Fe Springs, Calif.

[21] Appl. No.: 355,623

[22] Filed: Dec. 14, 1994

[51] Int. Cl.$^6$ .................................................. F16L 3/04
[52] U.S. Cl. .................... 285/136.1; 285/189; 285/329; 285/422; 285/917; 285/148.11; 285/148.19; 285/288.1; 29/890.14; 228/135
[58] Field of Search .............................. 285/173, 158, 285/329, 189, 378, 286, 422, 917, 175, 337; 29/890.14; 228/135

[56] References Cited

U.S. PATENT DOCUMENTS

| | | | |
|---|---|---|---|
| Re. 26,126 | 12/1966 | Buschow | 285/284 |
| 149,138 | 3/1874 | Landsdell . | |
| 405,745 | 6/1889 | Ross | 285/175 X |
| 640,197 | 1/1900 | Hewlett . | |
| 839,090 | 12/1906 | Ayer | 285/329 |
| 1,115,912 | 11/1914 | Dodson | 285/175 X |
| 1,231,548 | 6/1917 | Myers . | |
| 1,307,392 | 6/1919 | Codd . | |
| 2,081,156 | 5/1937 | Stone | 285/86 |
| 2,471,475 | 5/1949 | Andrus | 285/49 |
| 2,741,498 | 4/1956 | Elliott | 285/329 X |
| 2,787,481 | 4/1957 | Buschow et al. | 285/329 |
| 2,955,847 | 10/1960 | McKenna | 280/411 |
| 2,966,340 | 12/1960 | Champman | 285/422 X |
| 3,042,428 | 7/1962 | Gardiner | 285/173 |
| 3,127,182 | 3/1964 | Wardleigh | 285/187 X |
| 3,207,524 | 9/1965 | Trbovich | 285/917 X |
| 3,212,796 | 10/1965 | Neuschotz | 285/158 X |
| 3,415,546 | 12/1968 | Rubner et al. | 285/173 |
| 3,442,537 | 5/1969 | Courtot et al. | 285/174 |
| 3,459,372 | 8/1969 | Salamone | 236/93 |
| 3,520,562 | 7/1970 | Moos | 285/158 X |
| 3,704,901 | 12/1972 | Borner | 285/173 |
| 3,858,911 | 1/1975 | Martin | 285/173 |
| 3,909,049 | 9/1975 | Blatnica | 285/329 |
| 4,289,334 | 9/1981 | Riley | 285/173 X |
| 4,336,958 | 6/1982 | Goetzinger | 385/55 |
| 4,366,971 | 1/1983 | Lula | 285/55 |
| 4,368,448 | 1/1983 | Kobayashi et al. | 336/61 |
| 4,415,187 | 11/1983 | Hudson, Jr. | 285/173 |
| 4,524,996 | 6/1985 | Hunt | 285/55 |
| 4,537,071 | 8/1985 | Waterman | 73/432 R |
| 4,538,837 | 9/1985 | Cronk | 285/55 |
| 4,600,219 | 7/1986 | Yoshida et al. | 285/55 |
| 4,626,001 | 12/1986 | Lee | 285/94 |
| 4,931,119 | 6/1990 | Watkins | 156/173 |
| 5,071,174 | 12/1991 | Griffin et al. | 285/173 |

OTHER PUBLICATIONS

Article "Model 50 COSASCO® Two–Inch System Access Fitting Assemblies," Rohrback Cosasco Systems, Inc., Bulletin #600–A.

Article "Model 58 COSASCO® Two–Inch System Access Fitting Assemblies," Rohrback Cosasco Systems, Inc., Bulletin #612.

*Primary Examiner*—Dave W. Arola
*Attorney, Agent, or Firm*—Renner, Otto, Boisselle, Sklar

[57] ABSTRACT

A high pressure access fitting for a vessel, pipe or like structure includes a body of a material which is weld compatible with the vessel so the fitting may be welded to the wall of the vessel. The fitting includes an internally threaded section made of another material which is a corrosion resistant alloy and which acts to inhibit galvanic corrosion. The threaded section is an insert made of HASTELLOY®, for example, and is threaded in place within the body with fine threads and with a metallic C-ring seal protecting the axial inner ends of the threads. The outer end projects beyond the body and provides a corner for a fillet weld. In addition, the fine threads of the insert/body connection are protected by a high temperature expandable sealing compound.

20 Claims, 3 Drawing Sheets

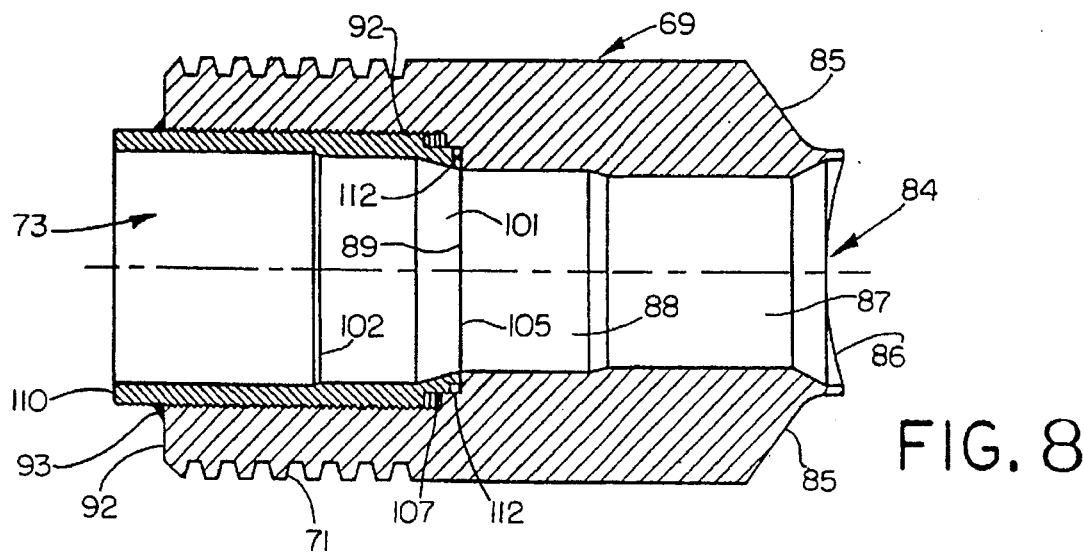
FIG. 8
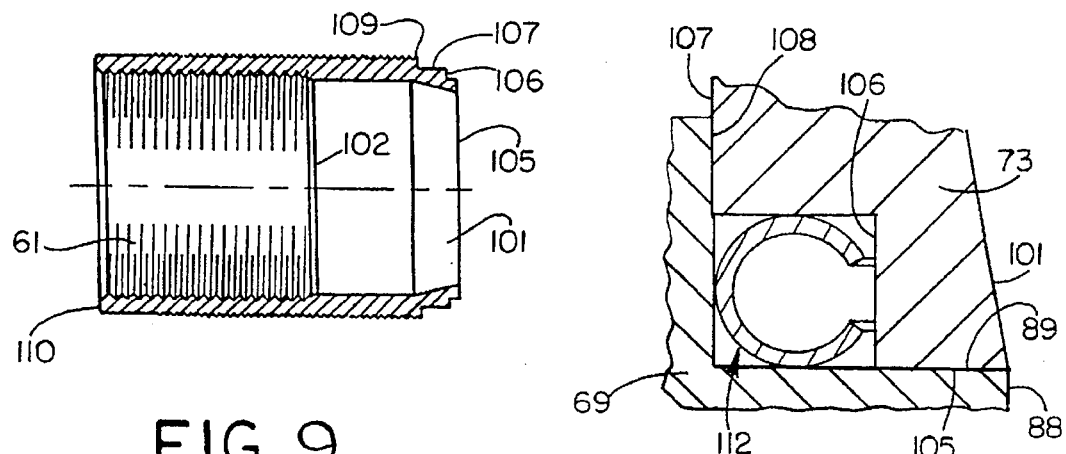
FIG. 9
FIG. 11
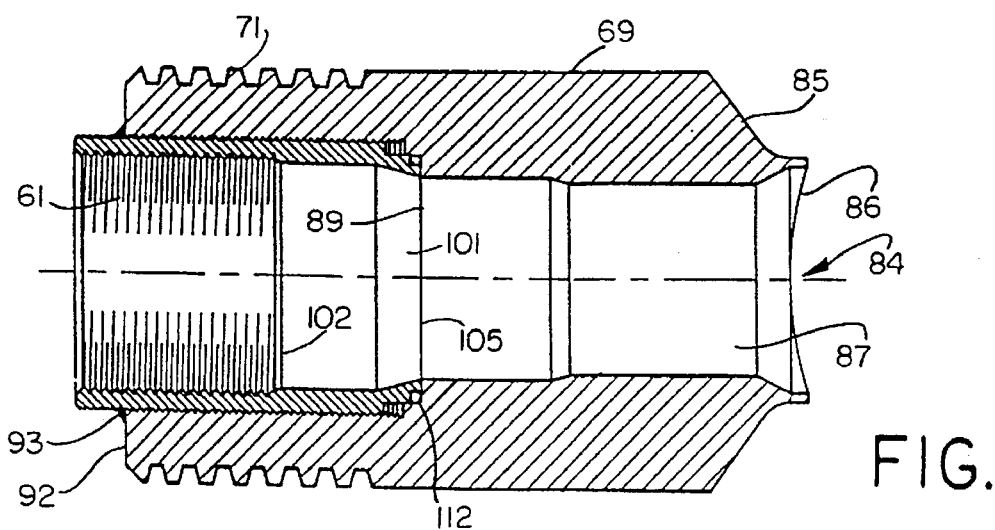
FIG. 10

HIGH PRESSURE ACCESS FITTING AND METHOD

This invention relates generally as indicated to a high pressure access fitting, and more particularly to a corrosion resistant fitting, and a method of making and installing the fitting.

BACKGROUND OF THE INVENTION

High pressure access fittings are commonly employed in structures such as high pressure tanks, vessels, pipes or the like, for example, to insert probes, probe anodes, cupons, to take samples, and for many other purposes. High pressure access fittings are designed to permit safe, easy insertion and retrieval of corrosion and erosion monitoring systems as well as preventive maintenance devices for injecting inhibitors or for sampling, etc. even while under full operating pressure.

Such structures may be designed to contain fluids or materials at very high pressures such as 6000 psi (2,908,000 $N/M^2$) for example, and at elevated temperatures. Many of the materials or fluids may be corrosive. The high pressure access fittings may be incorporated as part of the structure when built, or may be added to the structure later, and even while the structure or vessel is under pressure.

Special tools which include high pressure valves are employed to insert or remove the various tubes, probes or plugs. An example of one such tool is shown in applicants prior U.S. Pat. No. 4,537,071. Such tools can also be used to hot tap the vessel or structure after the fitting is installed and while the structure is under pressure.

The fitting usually includes a body welded or otherwise secured to the wall of the structure. The interior of the body of the fitting at the neck includes precision threads into which the plug or probe, for example, is secured. Just axially inside the threads is a seating surface for seals of the plug or probe. The exterior of the neck is provided with somewhat coarser threads to secure a cap, or quickly to land the tool to remove and insert the plugs or probes, or to drill the hole within the fitting after the body is secured to the wall.

The internal threads usually have a very shallow low pitch angle so that the tool is required to turn the plug or probe perhaps three or more turns to let the pressure bypass when the plug or probe is removed or backed out. Although such threads and seal seating surfaces may not normally be exposed to the corrosive contents of the structure, they are, however, exposed during installation or change out. Even after equipment is installed, the corrosives of the vessel or structure will remain in this area.

The body of the fitting must normally be the same or similar material as the structure wall to which it is attached to enable proper field attachment through welding. This usually requires that the body be made from a welding compatible grade of steel.

While the design of the body can increase the wall thickness to allow for certain corrosion over time, the internal threads and seal seats are critical and the thread configurations and diameters must be maintained for the access fitting to function as intended over the life of the structure. A failure in the area of the threads or seal seating surfaces brought on by corrosion may result in a violation of vessel or structure integrity which is a real safety and environmental concern. If the fitting threads corrode and become unusable, the fitting is no longer usable for access and should be removed or plugged, and replaced. Too many access fittings may compromise the structure. Accordingly, if a different metal can be employed for the internal thread section at the neck of the fitting which would be resistant to corrosion and help prevent galvanic corrosion, the service life of the fitting could be greatly extended. If the different metal is in the form of an insert, the insert must be secured in a proper and economical matter to ensure that the threads are axially aligned and correct, and that additional points of corrosion are not created.

SUMMARY OF THE INVENTION

A high pressure access fitting for a pressure vessel and the like structures includes a body which is made of a metal such as steel which enables the fitting to be correctly field welded to the wall of the structure. The precise internal threads are formed in a corrosion resistant alloy insert which is fitted inside the neck of the body. Precision low pitch angle threads to receive a plug or probe, for example, are formed in the insert adjacent seal seating surfaces.

In a preferred form, the insert is itself threaded into the body with very fine threads. The end of the insert toward the structure or the axial inner end of the insert includes a seal to protect the body-insert threaded connection from exposure to the corrosive contents of the vessel or structure. The seal is preferably a corrosion resistant metal C-ring, seated in a shoulder of the insert with axial contact between the insert and body acting as a stop controlling the amount of compression on the seal.

The insert projects axial slightly beyond the body and provides a corner for a fillet weld. In addition, a high temperature expandable sealing compound is employed contained between the C-ring and fillet weld. The compound expands on contact with the process fluid providing a secondary seal in the event of primary seal failure.

The insert is preferably made of a corrosion resistant alloy material which itself helps to prevent galvanic corrosion of the fitting body. Examples of such useful alloy materials are HASTELLOY® alloys, INCONEL® alloys, MONEL® alloys, stainless steels, and copper-nickel alloys. HASTELLOY is a registered trademark of Haynes International Inc. and INCONEL and MONEL are registered trademarks of Inco Alloys International Inc.

The threads and/or seal seats on the interior of the insert may be tapped and finished before or after the insert is secured into the body. The order of assembly and threading may depend on dimensional and alignment requirements, as well as the technique of assembling the body and insert. With the invention a precision corrosion resistant high pressure access fitting is provided which has a longer useful life.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 8 is a wew like FIG. 5 with the insert assembled but not yet internally threaded;

FIG. 9 is a wew like FIG. 6 but with the insert internally threaded before insertion;

FIG. 10 is a view like FIG. 7 showing the final assembly of the body and insert regardless of the sequence of the internal threading of the insert; and FIG. 11 is an enlarged fragmentary radial section of the metal ring seal employed at the axial inner end of the insert.

DETAILED DESCRIPTION OF THE PREFERRED EMBODIMENTS

Figure 1:
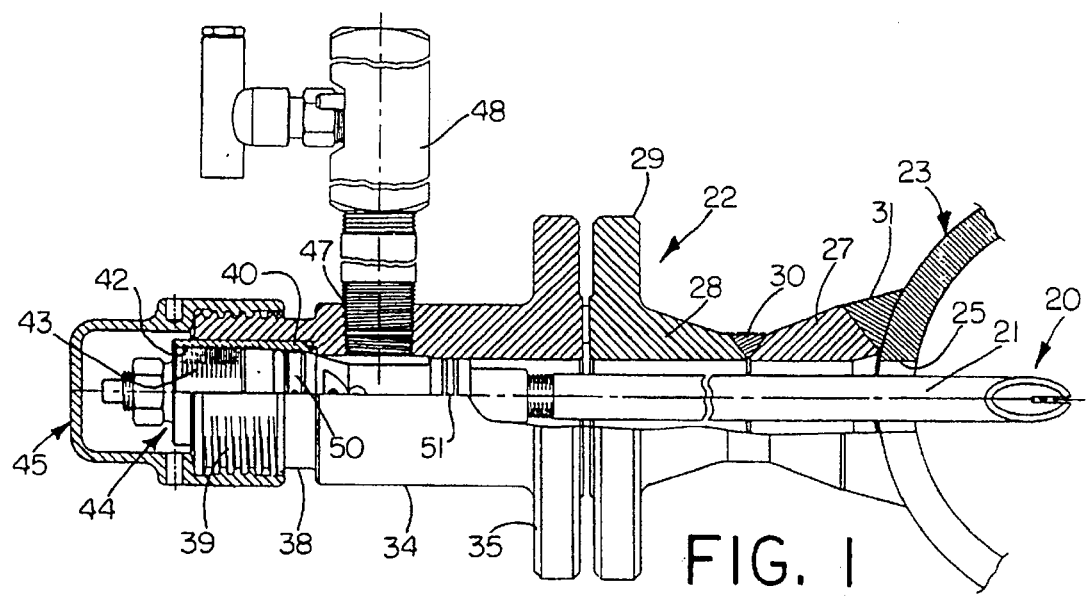
FIG. 1 is an axial quarter section of a flange type tee fitting in accordance with the present invention using a solid plug.

Referring initially to FIG. 1, there is illustrated a quill shown generally at 20 in the form of an injection tube 21 inserted through an access fitting shown generally at 22 into pressure vessel or structure 23. The structure 23 may, for example, be a high pressure pipe. The injection tube extends through a port 25 in the wall of the structure and through a welded inner flange body which comprises two parts 27 and 28, the later including flange 29. The two parts are welded to each other as indicated at 30 and the assembled parts are welded to the exterior of the structure as seen at 31.

The fitting illustrated also includes an outer fitting body 34 which includes a flange 35 which enables the body 34 to be secured to the flange 29 through a typical high pressure ANSI flange connection. In typical fashion, the flanges are connected by a large number of fasteners equally torqued with a high pressure gasket therebetween. There are a number of types of ANSI flange connections which may equally well be employed.

The body 34 includes an outer somewhat reduced neck 38, the exterior of which is provided with coarse threads 39, and the interior of which includes insert 40. The insert is secured to the neck of the body and is provided with relatively fine low helix angle internal threads seen at 42 which receive matching external threads 43 of solid plug assembly 44. The coarse external threads 39 receive matching internal threads on cap 45. The body 34 includes a tapped transverse port 47 which receives a shutoff valve assembly 48. The solid plug assembly includes two spaced seal assemblies shown at 50 and 51 on opposite sides of the lateral port 47. The opening and closing of the valve 48 permits samples to be taken or fluid injected into the structure. The coarse threads 39 on the exterior of the neck or outer end of the fitting body 34 not only receive the cap 45 but also permit the hot tap or special tool such as shown in applicants prior U.S. Pat. No. 4,537,071 to be quickly landed or secured to the fitting.

Figure 2:
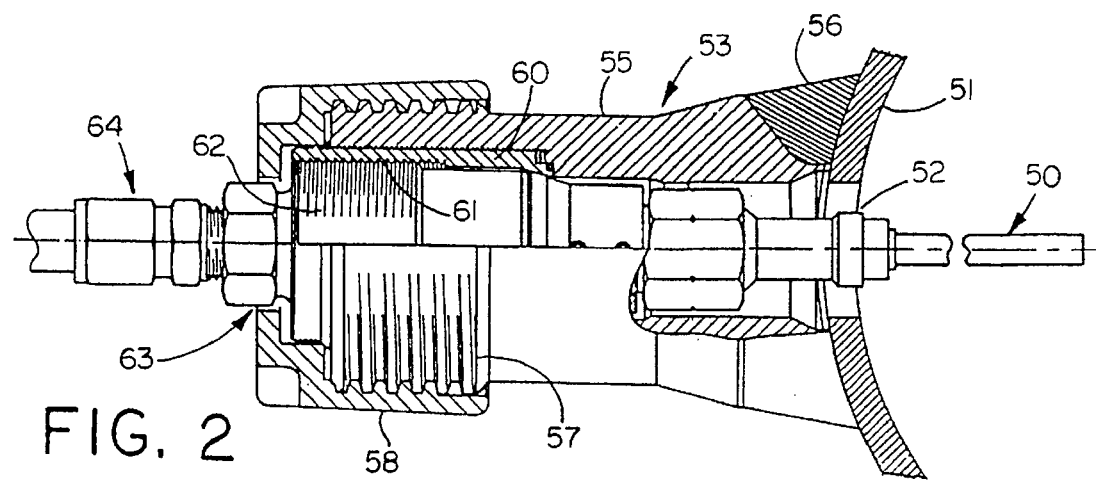
FIG. 2 is a similar view of a weld type fitting showing a probe inserted through a hollow plug.

FIG. 2 illustrates a high pressure access fitting in accordance with the present invention with a corrosion probe 50 extending into pressure vessel or structure 51 through port 52 from high pressure access fitting 53. The fitting is of the flarweld type and includes a body 55 welded as indicated at 56 to the exterior of the pressure vessel 51. The body includes coarse external threads 57 at the outer end to receive the cap 58 or the special tool. The body is provided with an internal insert 60 which has internal thread 61 receiving the matching external threads 62 of hollow plug 63. The corrosion probe 50 is connected through probe adapter 64 to a transmitter not shown.

Figure 3:
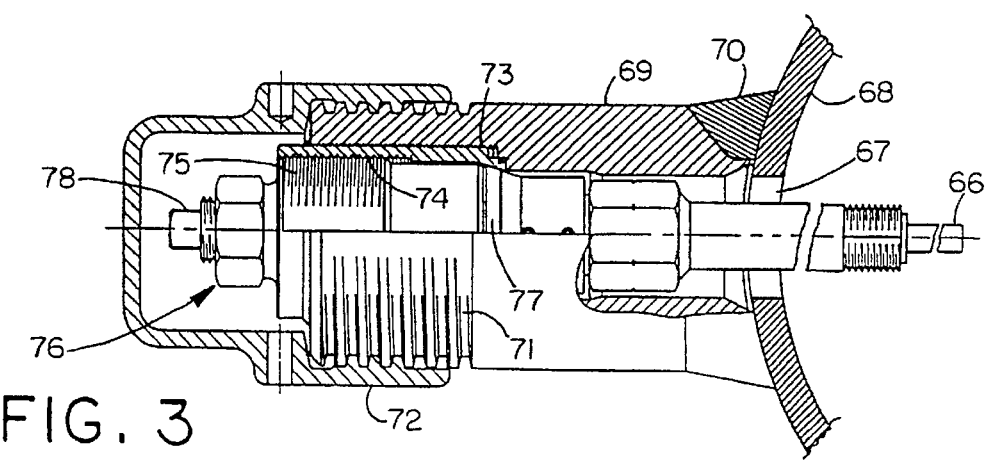
FIG. 3 is a view similar to FIG. 3 showing a probe inserted with the same plug closed and a different cap.
Figure 4:
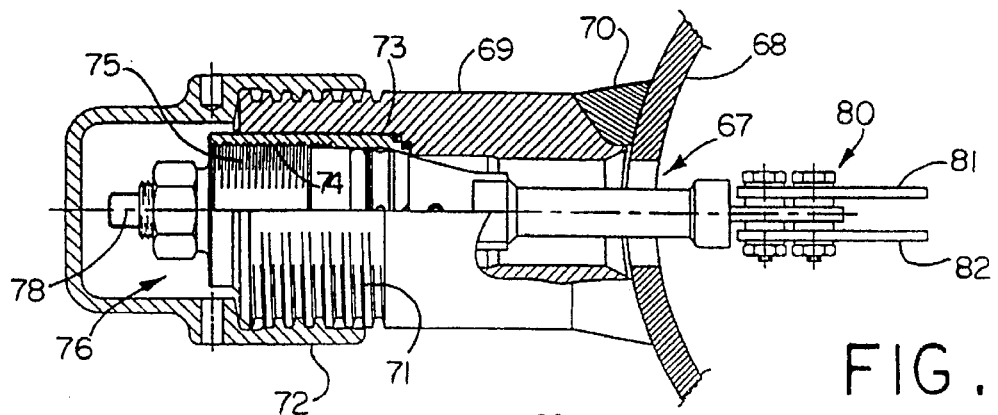
FIG. 4 is a similar view showing an assembly strip and cupons inserted.

In FIGS. 3 and 4, there is illustrated the same high pressure access fitting for two different types of probes. In FIG. 3, the tube element probe 66 extends through port 67 and in the wall 68 of high pressure vessel. The high pressure access fitting includes a body 69 welded as indicated at 70 to the exterior of the vessel. The body includes coarse external threads at the outer end seen at 71 to receive cap 72. The body is provided with an internal insert 73 having internal threads 74 receiving matching threads 75 of hollow plug 76. The plug is sealed at 77. The pipe plug 78 closes the end of the hollow plug. In FIG. 4, the probe comprises an assembly strip shown generally at 80 with cupons 81 and 82. Such cupons are used in connection with the corrosion monitoring of pressure vessels and for other purposes. The fitting is basically otherwise the same as in FIG. 3.

The illustrations of FIGS. 1–4 are merely a few examples of the manner in which the high pressure access fitting of the present invention can be employed. Many other applications will occur to those skilled in the art.

Figure 5:
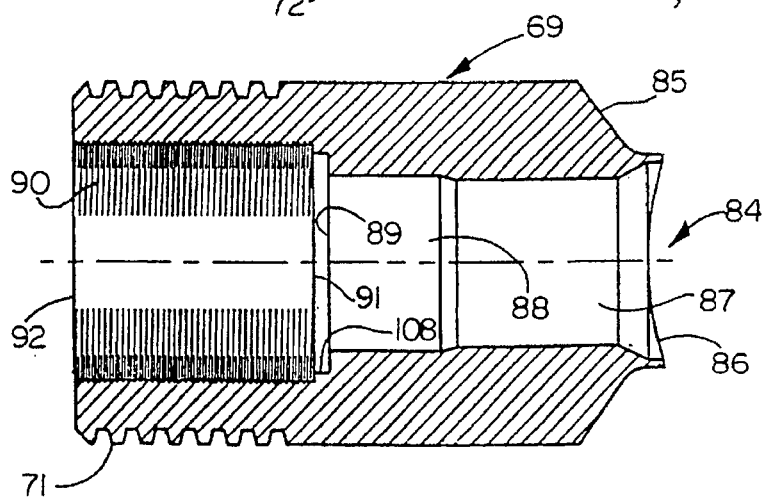
FIG. 5 is an enlarged axial section of one form of fitting body.

Referring now to FIG. 5, there is illustrated a non-Tee ilarweld body 69 which is made of a grade of steel which is compatible with the steel of the structure 68 so that a good field weld may be obtained between the body and the structure. The proximal end of the body indicated at 84 is provided with an undercut 85 and is shaped at 86 to conform to the exterior of the structure 68 around the center passage 87. The undercut 85 provides a V-shape notch for the weld fillet 70 which enables the body to be secured to the exterior of the vessel 68 in the field.

The passage 87 is provided with a slightly enlarged bore 88 which forms an expansion around the axially spaced seals of the hollow plug embodiment of FIG. 1. The passage is then provided with a right angle radial shoulder indicated at 89. Slightly spaced from the shoulder, the balance of the interior distal end of the body is provided with fine low pitch angle threads indicated at 90. The diameters of the threads 90 are slightly larger than the outer diameter of the shoulder 89. The threads 90 are quite shallow and may, for example, have a major diameter on the order of 2.000 inches (5.08 cm) and a minor diameter of no less than about 1.946 inches (4.94 cm). The threads 90 extend axially from the point 91 slightly spaced from the shoulder 89 to the outer or distal end of the body 92.

Figure 6:
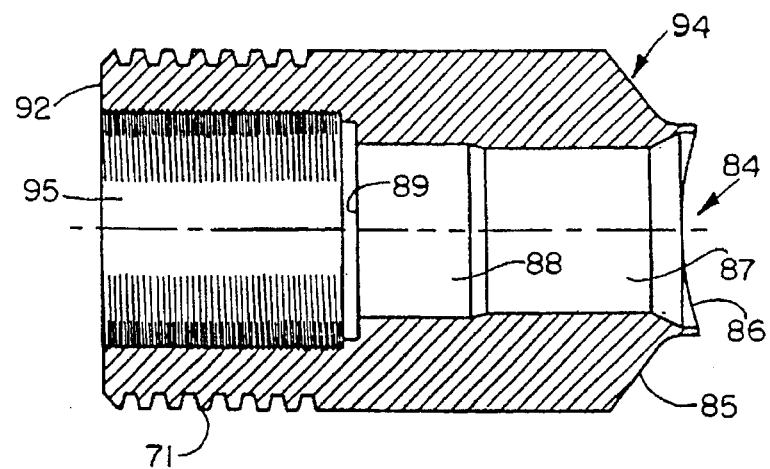
FIG. 6 is a view like FIG. 5 but with opposite hand threads in the body.

In FIG. 6, there is illustrated a body 94 which is identical to the body shown in FIG. 5 except that the threads 95 are of opposite hand. In other words, the threads 90 or 95 may be right or left hand threads.

Figure 7:
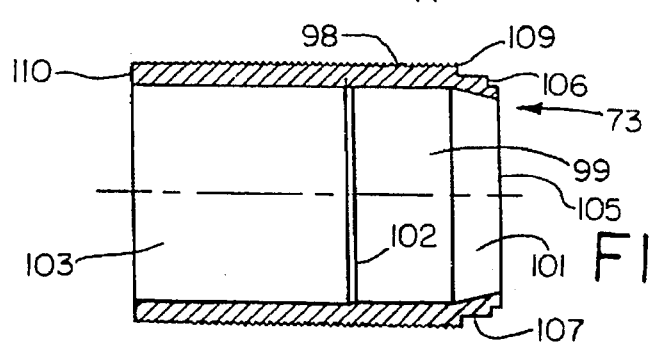
FIG. 7 is an axial section of the insert before internal threading.

Referring now to FIG. 7, there is illustrated the insert 73 which is in the form of a relatively thin sleeve made of a more exotic alloy which will resist corrosion and help prevent galvanic corrosion of the entire fitting.

While the body of the fitting 69 is generally made of a carbon steel such as AISI 1022, ASTM A105, ASTM 350 LF2, to be compatible with the material of the structure so that a good field weld can be made, the insert 73 is carefully attached to the fitting under laboratory or shop conditions and is made of a more corrosion resistant alloy.

The preferred alloys and their unified numbering system designations are:

| ALLOY | UNS DESIGNATION |
| --- | --- |
| HASTELLOY C-276 | N10276 |
| HASTELLOY C-22 | N26022 |
| INCONEL 625 | N06625 |
| INCONEL 600 | N06600 |
| INCONEL X750 | N07750 |
| INCOLOY 825 | N08825 |
| MONEL 400 | N04400 |
| MONEL K500 | N05500 |
| DUPLEX S.S. 2205 | S31803 |
| 316 S.S. | S31600 |
| 304 S.S. | S30400 |
| COPPER-NICKEL 9010 | C70610 |

As noted above, HASTELLOY, INCONEL and MONEL are registered trademarks.

The sleeve 73 seen in FIG. 7 has not yet been provided with internal threads but does include external threads indicated at 98 which match the threads 90 or 95 seen in FIGS. 5 and 6. The passage through the insert indicated at 99 is designed to be a continuation of the passage 87 of the body 69. The passage initially includes a slight conical section 101 which is designed as a seat for the single seal of the solid plugs or the outer seal of the hollow plugs. From the conical section 101, the passage 99 continues to a slight shoulder 102 which marks the beginning of an internally threaded section 103. However, in FIG. 3 the threads have not yet been formed.

The inner end or front of the sleeve 73 forms an annular face 105 normal to the axis of both the insert and the body. The face 105 is designed to seat on the shoulder 89 of the body. The outer corner of the insert is provided with a shoulder seen at 106. The axial depth of the shoulder from the face 105 is controlled with precision. From the shoulder 106, the exterior of the insert continues in a short right circular cylindrical section 107 which closely telescopes within the axial extent of the shoulder 89 seen at 108 in FIG. 5, and also shown in FIG. 11. The balance of the exterior of the insert is externally threaded with the matching threads 98. The threads continue from the slight shoulder indicated at 109 to the very outer end of the insert seen at 110.

Referring now to FIG. 8 and 11, it will be seen that the insert 73 has been threaded into the body 69 to bring the abutting faces 89 and 105 together and in the process compressing to a controlled degree a C-shape metal seal ring 112 seen in detail in FIG. 11. As seen in FIG. 11, the axial engagement of the faces 89 and 105 as the insert is threaded in place limits the compression of the C-ring and prevents overtightening.

As noted from FIG. 8, the insert 73 projects beyond the distal or outer face 92 of the body and provides a corner for a fillet weld 93 securing the insert to the body when the insert is fully threaded into the body. The fillet weld 93 can be done in the shop or laboratory under controlled conditions for welding dissimilar metals. The weld leaves a radial shoulder surface on the end of the body at 92 to accommodate a face seal used in connection with the retrieving tool. The weld at the outer end of the interface between the external threads of the insert and the internal threads of the body seals one end. The metal C-ring at the opposite end seals the other end and in addition, a high temperature expandable sealing compound is also employed to be contained in the annular area between the metal seal ring and the weld. The sealing compound expands upon contact with any process fluid and provides a secondary seal for the threads in the event of failure of the C-ring. A useful compound is a high temperature and high pressure pipe joint sealing compound sold under the trademark X-PANDO® by X-PANDO Products Company of Trenton, N.J., USA. X-PANDO® is a registered trademark of X-PANDO Corporation of Long Island City, N.Y., USA.

In the process embodiment of FIG. 7, the insert is first assembled with the body and then the insert is provided with internal threads 61. In the embodiment shown in FIG. 9, the insert 73 is provided with the internal threads 61 before insertion into the body. The body may be somewhat easier to grip and maintain in concentricity in some tapping operations and once the insert and body are assembled as in FIG. 8, the threads on the exterior of the insert are protected. In any event, the internal threads on the insert may be tapped and finished before or after the insert is secured into the body. The order of assembly and threading may depend on dimensional and alignment requirements, as well as the technique of assembling the body and insert.

It is noted that the threads 61 on the interior of the insert extend from the slight shoulder 102 to the end 110, and that the threads 61 are still quite fine although more coarse than the threads 90 or 98. The internal threads in the fitting for mounting the plugs are designed for driving the plugs in and out of the fitting. They are coarse enough not to be greatly affected by trash in the vessels and fine enough to ensure that the operator can not remove the plug from the fitting faster than it can equalize pressures on opposite sides of the plug. The external threads on the insert permanently retaining the insert in the fitting are very fine to ensure sufficient wall thickness of the fitting and are capable of carrying great loads. The external threads 71 on the fitting body are the most coarse of all and are designed to receive quickly a wide variety of caps and also the service valve of the retrieving tool.

The fittings are useful with two types of plugs. The hollow plug is used for probes and the solid plug is used for various types of coupon holders and universal nuts, used to hold injection or sampling nozzles. The hollow plug has one primary pack and seal in a groove cut through the retaining threads. When the plug is back from the fitting of few threads, using the retrieval tool as shown in Applicant's prior patent, fluid in the vessel bypasses the seal and travels through the groove equalizing pressure between the vessel and the retrieval tool. The plug is then backed out of the fitting and pulled through the valve and into the retriever. The valve is then closed and pressure in the retrieval tool is bled off prior to removing the plug from the retriever. The solid plug works in the same manner. However, it has two sets of seals and a port that runs between them and the back of the plug. When the plug is backed off a few threads, pressure equalizes via the port. This has the advantage that samples or pressure measurements can be taken without the plug retaining threads leaking until the second seal backs off its sealing surface in the fitting.

It can now be seen that there is provided a precision high pressure long life access fitting for pressure vessels wherein a wide variety of cupons, injectors, probes such as electrical resistance or linear polarization, and sand, hydrogen, injection or sampling nozzles may be positioned in and retrieved from pressure vessels and other structures.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A method of making a high pressure access fitting for a metal pressure vessel comprising the steps of providing a tubular fitting body adapted to be secured to the exterior of the vessel, the metal of the body being welding compatible with the metal of the pressure vessel and of a wall thickness to allow for corrosion, threading an insert into said body away from the vessel, said insert being a metal alloy inhibiting the corrosion of the body and itself resistant to corrosion, and providing with internal fine threads and wherein said internal fine threads are more coarse than the threaded connection between the insert and body, and are opposite hand the threaded connection between the insert and body.

2. A method as set forth in claim 1 wherein said body is a carbon steel, and said insert is an alloy selected from a group of alloys consisting of HASTELLOY, INCONEL, MONEL, Stainless Steel and Copper-Nickel.

3. A method as set forth in claim 1 wherein said internal threads are formed after the insert is assembled with said body.

4. A method as set forth in claim 1 wherein said internal threads are formed before the insert is assembled with said body.

5. A high pressure access refitting for a pressure vessel, made of one metal, said fitting comprising a body made of a metal which is field welding compatible with said one metal, an internal insert threaded in the outer end of said body said insert seating against an internal abutting face of a shoulder in said body and being made of a corrosion resistant alloy to inhibit corrosion of both the threads and body.

6. A high pressure access fitting as set forth in claim 5 wherein said body is made of carbon steel and said insert is made of nickel alloy.

7. A high pressure access fitting as set forth in claim 6 wherein said alloy is selected from the group consisting HASTELLOY C-276, HASTELLOY C-22, INCONEL 625, INCONEL 600 and INCONEL X750.

8. A high pressure access fitting as set forth in claim 5 wherein said insert is provided with internal threads more coarse than the threaded connection between the insert and body.

9. A high pressure access fitting as set forth in claim 8 wherein said internal threads are opposite hand the threaded connection between the insert and body.

10. A high pressure access fitting as set forth in claim 5 including a C-ring seal between said insert and body, said shoulder in said body limiting the compression of said seal.

11. A method of making a high pressure access fitting for a metal pressure vessel comprising the steps of providing a tubular fitting body adapted to be secured to the exterior of the vessel, the metal of the body being welding compatible with the metal of the pressure vessel and of a wall thickness to allow for corrosion, threading an insert into said body away from the vessel, said insert being a metal alloy inhibiting the corrosion of the body and itself resistant to corrosion, and providing the insert with fine threads said insert being provided with internal threads more coarse than the threaded connection between the insert and body, said insert projecting axially beyond said body to form an annular corner with the outer end face of the body, and forming an annular fillet weld between said insert and body at said corner.

12. A method as set forth in claim 11 including the step of using a seal ring between the insert and body to seal the threaded connection between the body and insert.

13. A method as set forth in claim 12 wherein said ring is a metal C-ring, and limiting the compression of said ring upon assembly.

14. A method as set forth in claim 13 including the step of providing a temperature expandable sealing compound behind said seal as a secondary seal.

15. A high pressure vessel fitting for a pressure vessel, made of one metal, said fitting comprising a body made of a metal which is field welding compatible with said one metal, an insert threaded into said body said insert being made of a corrosion resistant alloy to inhibit corrosion of both the threads and body, said insert projecting axially beyond said body to form an annular corner with the outer end face of the body, and an annular fillet weld in said corner.

16. A high pressure access fitting for a pressure vessel, made of one metal, said fitting comprising a body made of a metal which is field welding compatible with said one metal, an insert threaded into and fixed in said body, said insert being made of a corrosion resistant alloy to inhibit corrosion of both the threads and body, internal threads in said insert which are opposite hand the threaded connection between the body and insert, and a seal ring between the insert and body to seal said threaded connection between the body and insert.

17. A high pressure access fitting as set forth in claim 16 wherein said ring is a metal C-ring, and means to limit compression of said ring as the insert and body are assembled.

18. A high pressure access fitting as set forth in claim 16 including a high temperature expandable sealing compound behind said seal ring as a secondary seal.

19. A high pressure access fitting for a pressure vessel, made of one metal, said fitting comprising a body made of a metal which is field welding compatible with said one metal, an insert threaded into said body, said insert being made of a corrosion resistant alloy to inhibit corrosion of both the threads and body, a metal C-ring between the insert and body to seal the threaded connection between the body and insert, and means to limit compression of said ring as the insert and body are assembled, said insert projecting axially beyond said body to form an annular corner with the outer end face of the body, and an annular fillet weld in said corner.

20. A high pressure access fitting as set forth in claim 19 including a high temperature expanding sealing compound between said seal ring and weld to act as a secondary seal for the threaded connection between the body and insert.

* * * * *